(12) United States Patent
James (10) Patent No.: US 8,792,301 B2
(45) Date of Patent: Jul. 29, 2014

(54) SYSTEM AND METHOD FOR DISPLAYING SEISMIC HORIZONS WITH ATTRIBUTES

(75) Inventor: Huw James, Houston, TX (US)

(73) Assignee: Paradigm Sciences Ltd., Grand Cayman (KY)

( * ) Notice: Subject to any disclaimer, the term of this patent is extended or adjusted under 35 U.S.C. 154(b) by 1359 days.

(21) Appl. No.: 12/090,584

(22) PCT Filed: Oct. 19, 2006

(86) PCT No.: PCT/IL2006/001211
§ 371 (c)(1),
(2), (4) Date: Apr. 17, 2008

(87) PCT Pub. No.: WO2007/046107
PCT Pub. Date: Apr. 26, 2007

(65) Prior Publication Data
US 2008/0285384 A1    Nov. 20, 2008

Related U.S. Application Data

(60) Provisional application No. 60/728,765, filed on Oct. 21, 2005.

(51) Int. Cl.
*G01V 1/34*  (2006.01)
*G01V 1/30*  (2006.01)

(52) U.S. Cl.
CPC .............. *G01V 1/301* (2013.01); *G01V 1/345* (2013.01)
USPC .................. 367/72; 367/70; 367/73; 702/16

(58) Field of Classification Search
USPC .............................. 367/71–73, 68, 70; 702/16
See application file for complete search history.

(56) References Cited

U.S. PATENT DOCUMENTS 5,056,066 A * 10/1991 Howard ........................ 367/72
5,251,184 A * 10/1993 Hildebrand et al. ............ 367/72
(Continued)

OTHER PUBLICATIONS

International search report of Application No. PCT/IL2006/001211 dated Jul. 7, 2008.

*Primary Examiner* — Ian J Lobo
(74) *Attorney, Agent, or Firm* — Pearl Cohen Zedek Latzer Baratz LLP (57) ABSTRACT

A system and method may, based on a 3D seismic data set seed point, execute a seed picking algorithm, using the first point for picking a set of second points from the data set, setting each of the points in the set of second points as the first point and repeating the algorithm. An iteration number or other attribute may be assigned to the points, the iteration number corresponding to the number of times the algorithm repeated to process the point. The attribute or a number of attributes may be displayed as a visual characteristic for each point. An iterative process may be applied to a set of seismic data points, starting at a seed data point and finding a set of next iteration seed points from among the set of points neighboring the seed point, continuing only with next iteration seed points, and recording for each of a set of data points the number of points that are found by the process when the point is used as a seed data point. Attributes may include, for example, the total number of descendants of a seed point, the direction, for example, the azimuth, of propagation of the horizon picking process, or information that relates to the order in which points are picked such as an iteration number.

18 Claims, 7 Drawing Sheets

(56) References Cited

U.S. PATENT DOCUMENTS

| | | | |
|---|---|---|---|
| 5,570,106 A * | 10/1996 | Viswanathan | 715/856 |
| 5,615,171 A | 3/1997 | Hildebrand | |
| 5,675,551 A * | 10/1997 | Sitoh | 367/73 |
| 6,674,689 B2 | 1/2004 | Dunn et al. | |
| 7,542,037 B2 * | 6/2009 | Fremming | 345/420 |
| 2004/0098200 A1 | 5/2004 | Wentland et al. | |
| 2004/0153247 A1 | 8/2004 | Czernuszenko et al. | |

* cited by examiner

SYSTEM AND METHOD FOR DISPLAYING SEISMIC HORIZONS WITH ATTRIBUTES

CROSS-REFERENCE TO RELATED APPLICATIONS

This application is a national Stage application of International Application PCT/IL2006/001211, filed on Oct. 19, 2006, which claims priority from U.S. Provisional application 60/728,765, filed on Oct. 21, 2005, each incorporated by reference herein in its entirety.

FIELD OF INVENTION

The present invention relates generally to the field of three-dimensional (3D) seismic data presentation and interpretation. Specifically, it relates to a system and method for displaying the progress or result of 3D seismic horizon picking process.

BACKGROUND OF THE INVENTION

A horizon map, which is a presentation of a three-dimensional (3D) seismic data, may provide users, typically, for example, petroleum exploration professionals, with certain level of understanding of the geology and geometry of the subsurface of the earth. With recent progress in computer-aided oil exploration and oil field development, there is commercially available software that uses well-known algorithms to create a horizon starting from one or more initial seed points provided by a user. A horizon may be defined as for example a topographic representation of underground strata which may be for example calculated or determined from 3D volume data. A horizon may be a change in lithology in the crust of earth or a chronostratigraphic boundary represented in a 3D seismic volume by a characteristic trace shape over certain time or depth interval. A horizon created by an algorithm may be displayed on computer monitor screen, and usually is an x-y display including the seed points and other points, that may be known as 'picked points', derived by the algorithm from the seed points (or "seeds") and the 3D seismic data. For example, horizon generating and display systems are shown in U.S. Pat. No. 5,570,106, entitled "Method and Apparatus for Creating Horizons From 3-D Seismic Data," (attached hereto as Appendix A) and U.S. Pat. No. 5,615,171, entitled "Method and Apparatus for Finding Horizons in 3-D Seismic Data," (attached hereto as Appendix B) each of which incorporated by reference herein in their entirety.

SUMMARY OF THE INVENTION

Embodiments according to the present invention may provide a system and method for accepting a first point from a 3D seismic data set, executing a seed picking algorithm, using the first point for picking a set of second points from the data set, setting each of the points in the set of second points as the first point and repeating the algorithm, and assigning an iteration number to each of the points, the iteration number corresponding to the number of times the algorithm repeated, applied or executed to pick or process the point.

Embodiments according to the present invention may provide a system and method for processing 3D seismic data, including applying an iterative process to a set of seismic data points, the process starting at a seed data point, each iteration in the process corresponding to an iteration number, where at each iteration the process is applied to points neighboring the points currently being processed, and recording for a set of data points the iteration number in which the point was processed.

Embodiments according to the present invention may provide a system and method for processing 3D seismic data, including applying an iterative process to a set of seismic data points, the process starting at a seed data point and finding a set of next iteration seed points from among the set of points neighboring the seed point, the process continuing only with next iteration seed points, and recording for each of a set of data points the number of points that are found by the process when the point is used as a seed data point.

Embodiments of the invention provide a system, which may be for example a computer system, and a method, which may be a computerized-method, for picking horizons from a 3D volume of seismic traces, and for displaying progress or result of the order of progression including for example definition, calculation, storage and display of seismic attributes. Visual and/or graphic representation of the attributes may be for example color, brightness, etc. For example, each range of attributes may be assigned a color.

Embodiments of the invention provide a system and a method of automated horizon picking in a 3D volume of seismic data. The process of creating a horizon, horizon picking, may start at one or more seed locations and progress through the 3D seismic volume by comparing the seed and shapes of traces to be picked potentially over some time interval and by choosing the relatively similar, preferably the most similar, pick trace shape at each step. Examples of creating horizons are described in the above mentioned U.S. Pat. No. 5,570,106, and U.S. Pat. No. 5,615,171; however other methods of calculating or determining horizons may be used.

Embodiments of the invention may provide a system and a method to store attribute information at one or more, or each, picked points of a horizon, wherein the attribute information may include for example the number of steps or iterations between an original seed point and the picked points following the progression of a picking algorithm.

Embodiments of the invention may provide a system and a method to store attribute information at one or more, or each, picked points of a horizon, wherein the attribute information may include the number of further points being picked that result from the one or more picked points.

Embodiments of the invention may provide a system and a method to store attribute information at one or more, or each, picked points, wherein the attribute information may include the azimuth of propagation at the one or more picked points that are the mean of directions of the progression to, and the progression from, the one or more picked points.

Embodiments of the invention may provide a system and a method to display the attributes or derivatives of the attributes individually as a horizon map or surface.

Embodiments of the invention may provide a system and a method to display the attributes or derivatives of the attributes in combination with each other or other horizon attributes as horizon maps or surfaces.

BRIEF DESCRIPTION OF THE DRAWINGS

The principles and operation of the system, apparatus, and method according to embodiments of the present invention may be better understood with reference to the drawings, and the following description, it being understood that these drawings are given for illustrative purposes only and are not meant to be limiting.

For simplicity and clarity of illustration, elements shown in the drawings have not necessarily been drawn to scale. For example, the dimensions of some of tie elements may be exaggerated relative to other elements for clarity. Further, where considered appropriate, reference numerals may be repeated among the drawings to indicate corresponding or analogous elements throughout the serial views.

DETAILED EMBODIMENTS OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Embodiments of the present invention may include, at least in part, apparatuses for performing the operations herein, such as computers, workstations, processors, networks of such devices, or other computing or calculating systems. Such apparatuses may be specially constructed for the desired purposes or may include general purpose computers selectively activated or reconfigured by a computer program stored in the computers. Such computer programs may be stored in a computer readable storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions.

The methods and/or processes presented herein are not inherently related to any particular computer or other apparatus. Various general-purpose systems may be used with programs in accordance with the teachings herein, or it may prove convenient to construct a more specialized apparatus to perform the desired method. Embodiments of the present invention are not described with reference to any particular programming language. It will be appreciated that a variety of programming languages may be used to implement the teachings of the invention as described herein.

Unless specifically stated otherwise, as apparent from the discussions herein, it is appreciated that throughout the specification discussions utilizing terms such as "processing", "computing", "calculating", "determining", or the like, typically refer to the action and/or processes of a computer or computing system, or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Figure 1:
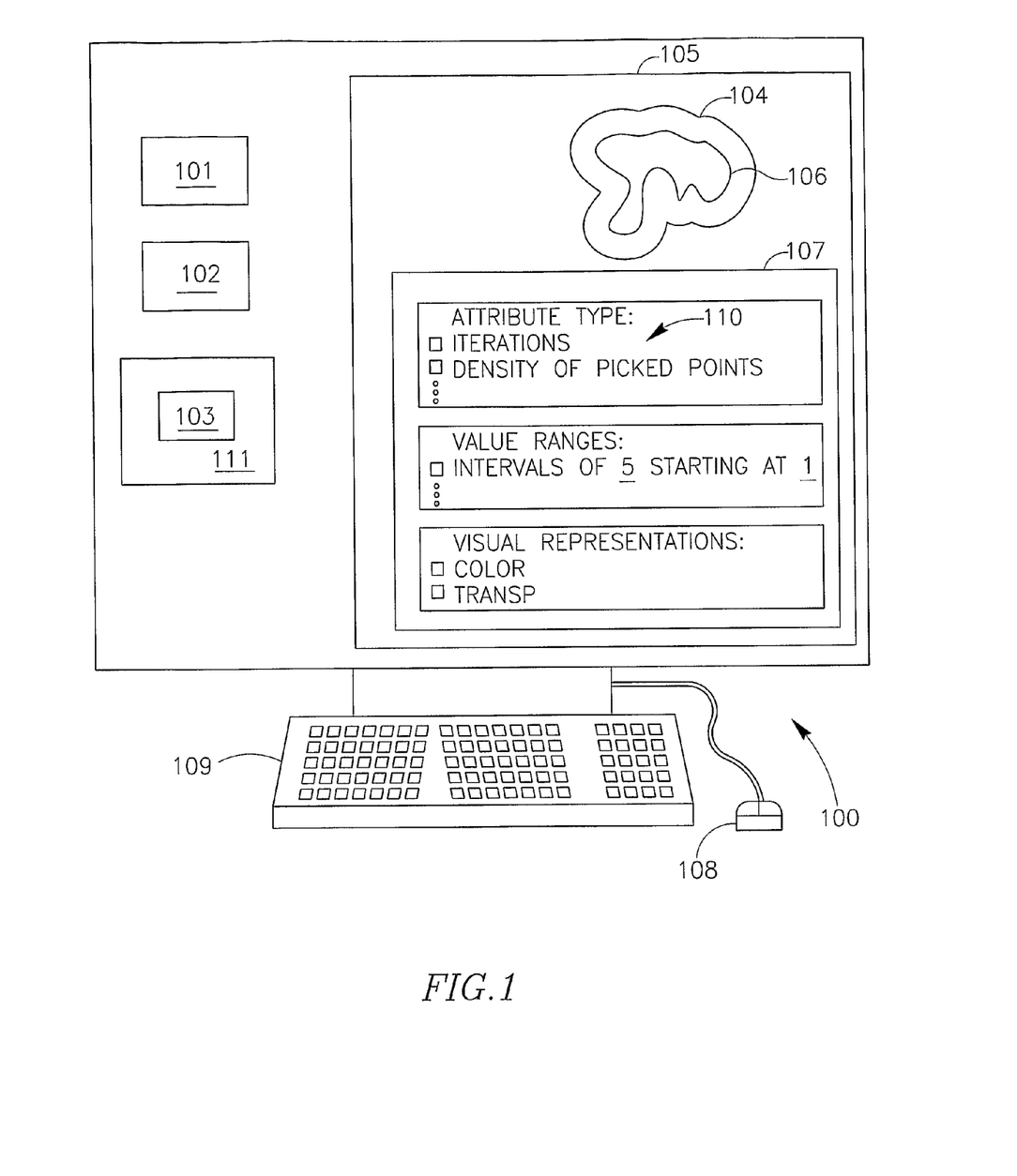
FIG. 1 depicts a computer system able to record attributes and display horizon maps with selective attributes according to one embodiment of the invention.

FIG. 1 depicts a computer system able to record attributes and display horizon maps with selective attributes according to one embodiment of the invention.

As illustrated in FIG. 1, a computer system 100 may have a processor 101, a memory 111, and access to and/or include software 102 executed by processor 101. Software 102 may be a horizon picking module, as is known in the art, that may, for example, pick points from a 3D volume of seismic data 103 to form a horizon map 104. The process of horizon picking by software 102 may include applying an iterative process or algorithm to a set of seismic data points, for example, using seismic data 103, stored in, e.g., memory 111. For example, software 102 may execute a seed picking algorithm, starting at one or more seed or start points of seismic data 103 and may progress through the volume of seismic data 103. In one embodiment, the iterative algorithm may compare the seeds and potential pick trace's shapes over some interval and choose the most similar pick trace shape at each step.

Software 102 may start at a point of seismic data 103 that may be provided manually be a user or automatically by the seed picking algorithm or by any other means. In some embodiments, software 102 may choose a set of next iteration seed points from among a set of points neighboring the seed point in seismic data 103. Software 102 may apply the iterative process may apply the chosen set of next iteration seed points.

In a demonstrative embodiment, software 102 may execute a seed picking algorithm using a first point of seismic data 103 for picking a second point from seismic data 103. The second point is typically picked from the neighbors of the seed point; or from the neighbors of the seed point that have not themselves been processed (to avoid backtracking). The second point or set of points may be considered a seed point during the next iteration. Software 102 may repeat the algorithm, executing the seed picking algorithm using the second point of seismic data 103 for picking a third point from seismic data 103, and so on. Such processes may be used to generate horizon map 104. Each point thus may correspond to an iteration (e.g., to an integer number corresponding to the number of iterations). Each point may also have associated with it all points that were found by the algorithm when that point was a seed point—e.g., each point, if the algorithm finds points based on that point, may be a parent point to one or many child points, which themselves can be considered seed points.

Along the progression of horizon picking, certain attributes associated with the propagation or status of horizon picking process at a picked point of seismic data 103 may be recorded, for example, the total number of descendants of a seed point, the direction, for example, the azimuth, of propagation of the horizon picking process, information that relates to the order in which points are picked such as an iteration number, or the number of descendants found using the horizon picking process on a seed point. Such information, such as, attributes 110 associated with points, may be stored, e.g., in memory 111. Values for multiple types of attributes 110 may be recorded for a picked point. Attributes 110 may include, for example, a rate or change in the rate of the picking of points, a direction of propagation that a picking algorithm picks points, the number of steps, iterations, or repetitions of the seed picking algorithm executed using a start point to pick the picked point, generations between an original seed or start points and the picked point, and/or the number of points being picked from a previously picked and/or start point (e.g., the number of points found when a point was used as a seed point), and/or the azimuth or other measure of special orientation. Information relating to an attribute value of a point may be displayed to the user, for example, as a visual representation of the value associated with each point or may alter the presentation of a point. For example a number of generations or picks, or a range of these numbers, may be associated with a visual representation such as color, brightness, etc. A point may be displayed according to its attribute, e.g., as a color depending on the attribute 110.

According to one embodiment of the invention, software 102 may selectively present attribute map 106, displaying recorded attribute data associated with one or more attributes of points picked from seismic data 103, or displaying points according to their attributes, for example, using a known seed picking algorithm. Attribute map 106 may be displayed adjacently or concurrently with, overlaid on, in place of, or substantially simultaneous to, horizon map 104. Concurrent displaying of seismic data and attribute data may provide insightful information to a user, for example, a petroleum exploration professional.

In some embodiments, attribute map 106 may be generated after the completion of horizon picking process. In other embodiments, attribute map 106 may be generated during the horizon picking process. For example, an attribute may be assigned to a picked point and/or mapped into attribute map 106 substantially simultaneously to the picking of the point, or during a time period substantially independent of the timing of subsequent seed picking steps.

In some embodiments, a petroleum exploration professional may interact with software 102 through a user interface 105, which may be a graphic user-interface (GUI) for example, to provide instructions to software 102 to process, for example, calculating derivatives of, the attributes, and/or make selections of the attributes to be displayed. User-interface 105 may also enable a professional to selectively choose attributes to be recorded and/or displayed during the process of point picking for horizon map 104. In a demonstrative embodiment, a plurality of different types of attributes, associated with picked point of seismic data 103, may be recorded. A distinct attribute map 106 may be generated for each of the plurality of attributes 110. User-interface 105 may include an attribute selection interface 107. Attribute selection interface 107 may allow a user to select which one or more of the plurality of attributes 110 and/or corresponding attribute maps 106 are to be displayed in user interface 105. Attribute selection interface 107 may allow the user to customize the manner in which the selected attribute maps 106 are displayed. Attribute selection interface 107 may allow the user to assign to each of a plurality of attributes, values of attributes, or ranges of attributes, different visual representations, for example, color, brightness, dots, columns, translucency, lines, etc. Attribute selection interface 107 may receive such selections or user input via input devices 108 and/or 109. In one embodiment, attribute map 106 may be overlaid onto horizon map 104 with values indicated by color variations or variations in other visual representations.

In some embodiments, attribute maps 106 may be hidden and/or revealed at the command of a user. Attribute selection interface 107 may allow the user to decide to hide or display horizon map 104 and/or each of attribute maps 106. Attribute selection interface 107 may offer the user other options.

Figure 2:
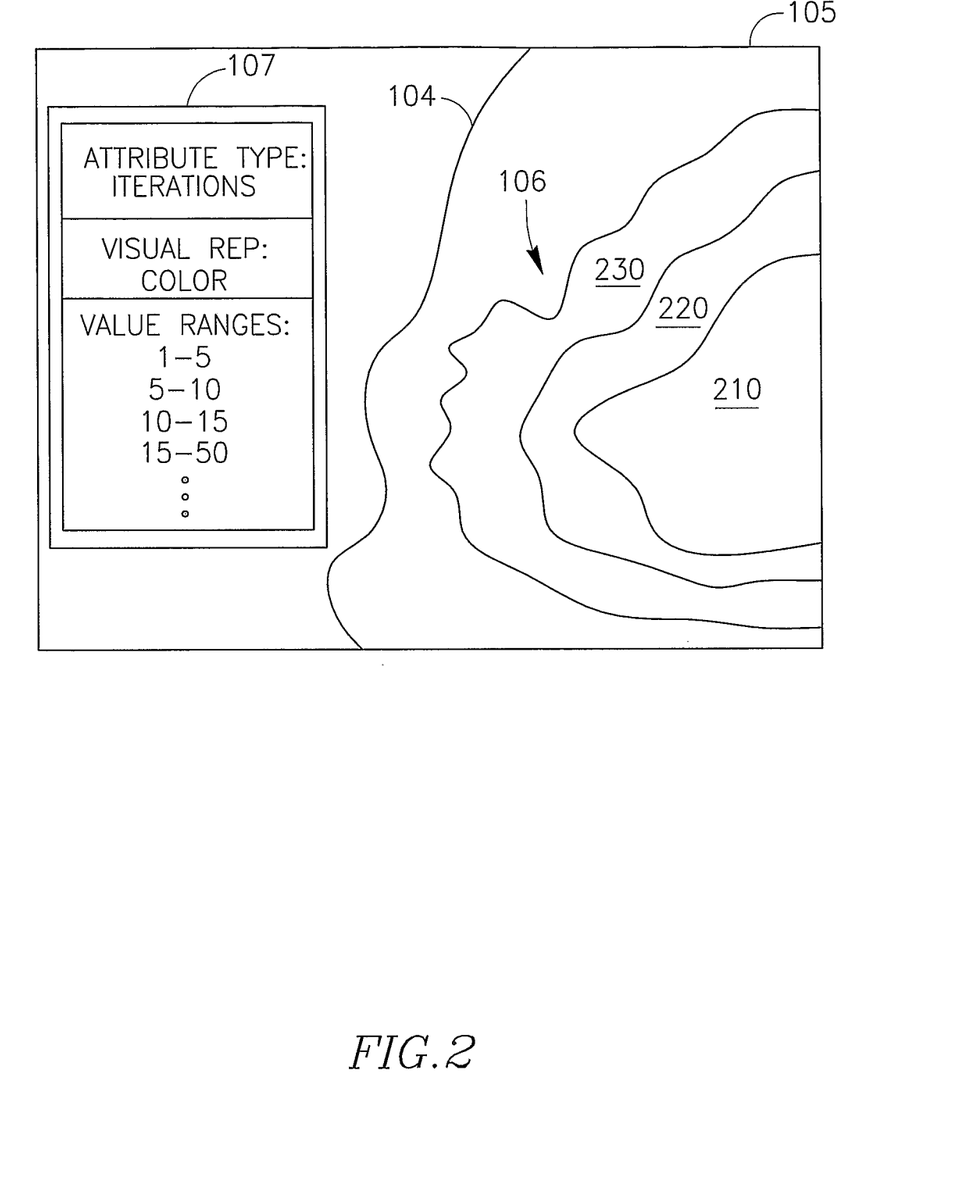
FIG. 2 is a graphical illustration of an attribute map displayed with a horizon map, according to one embodiment of the invention.

FIG. 2 is a graphical illustration of an attribute map displayed with a horizon map, according to one embodiment of the invention. An attribute map 106 may provide and/or display data associated with values or value ranges for one or more of attributes 110 corresponding to points picked from seismic data 103. Attribute map 106 may include regions 210, 220, and 230, including points picked from seismic data 103 with values for attribute 110 that fall within value ranges A, B, and C, respectively. In one embodiment, each of value ranges A, B, and C may be assigned a different level or sub-range of a visual representation, for example, a concentration or density of dots, a height of columns, a level of translucency, a difference in color or brightness of dots or points, a difference in the color or brightness of multiple lines, a width of the lines, or other suitable visual representations of attributes. Other visual variations and/or representations may be used to distinguish different value ranges A, B, and C and regions 210, 220, and 230. Other numbers of representations of attributes may be used. For example, a range of 256 colors may be used to represent a range of attributes.

Regions 210, 220, and 230, may each include different levels of visual representations corresponding to a different value range for attribute 110. Attribute map 106, for example, overlaid on, horizon map 104, may indicate an average value change of attribute 110 for points picked from seismic data 103.

In one embodiment, attribute 110 may include a number of iterations of a seed picking algorithm for picking a point from a start point. Value ranges A, B, and C, may be, for example, 1-5, 6-10, and 11-15, respectively. Visual representation may include, for example, color. For example, value ranges A, B, and C, may be assigned colors blue, green, red, respectively. Value ranges A, B, and C may be provided manually by a user or automatically by the seed picking algorithm or by any other method. Although three regions and three value ranges are described, any number of value ranges and regions may be used. Typically the narrower value ranges A, B, and C are, the greater the resolution of attribute data is provided. Other methods of displaying attribute data may be used.

Attribute map 106 may be displayed with horizon map 104, for example, by draping, overlaying, or adding points of attribute map 106 to horizon map 104. Each point of attribute map 106 may provide attributes 110 value or value range corresponding to one or more points picked from seismic data 103 and may be displayed with those points.

Displaying attribute map 106 with horizon map 104 may provide insightful information to a user, for example, a petroleum exploration professional, into the nature of geological structures from which seismic data 103 is collected. In some embodiments, seismic data 103 collected from regions containing faults, may impede or alter the propagation of a picking algorithm, resulting in discontinuities or abrupt changes in the generation count of spatially adjacent picked points in the neighborhood corresponding to the fault. For example, adjacent points may have very different iteration numbers. Attribute map 106 may include value ranges A, B, and C, for attribute 110, measuring, for example, the generation of picked point. The abrupt changes in the generation measure may correspond to neighboring points falling into different value ranges A, B, and C, and therefore into different regions 310, 320, and 330 in attribute map 106. The change in regions 310, 320, and 330 may be visually represented by a change in the visual representation associated with each of value ranges A, B, and C. Users, such as, petroleum exploration professionals may observe boundaries of regions 310, 320, and/or 330. For example, a high density of such boundaries, or boundaries with an odd shape, may indicate possible locations of faults, facies or other geological boundaries. For example, discontinuities in the surface, such as faults, may be highlighted by visual representations of attributes 110, such as the artificial illumination on the 3D topographic surface and discontinuities in the generation count or iterative number indicated by discontinuities in color. Where the colors are continuous there may be a grain to the color changes which indicates the direction of propagation of the algorithm used. For example, such a visual representation may be a change in color across a spectrum, from blue to green to yellow. The difference in the iterative number of neighboring points may be shown as a visual or graphical representation such as for example a difference in the color or brightness of multiple lines and/or the width of the lines. The lines may be replaced with for example dots and/or clustered dots and the differences may be represented by for example the density of the dots. Columns may be used with the height of the columns representing the difference in the number of steps.

Figure 3:
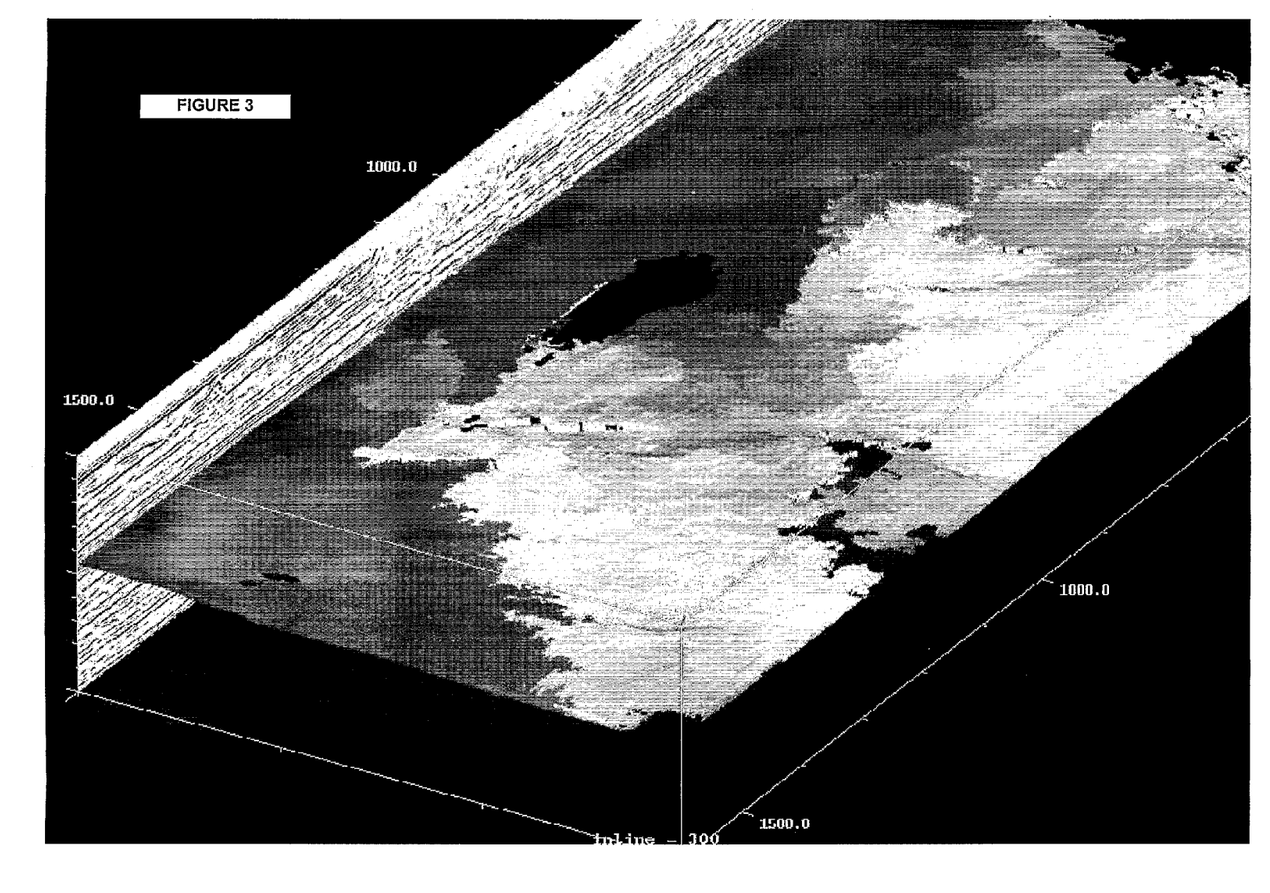
FIG. 3 is a graphical illustration of an attribute map and a horizon map, generated according to an embodiment of the invention.
Figure 4:
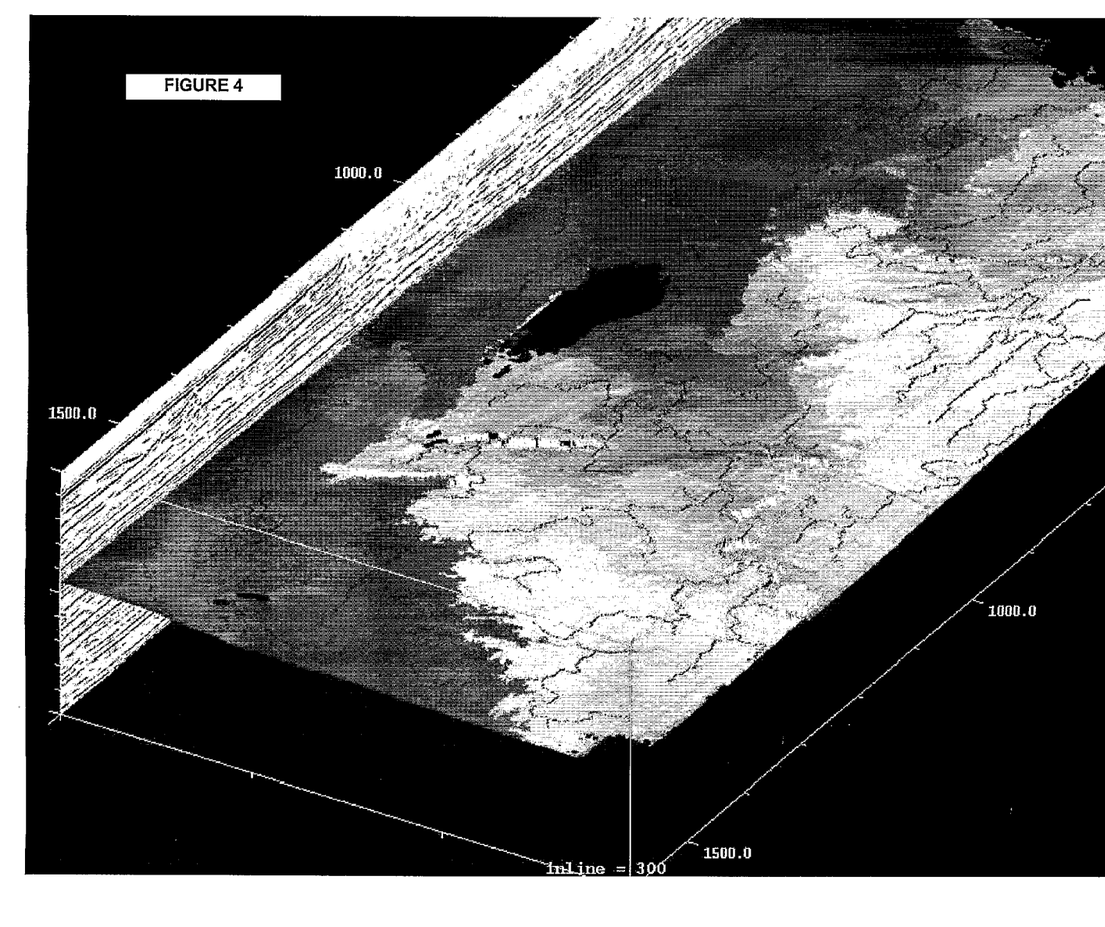
FIG. 4 is a graphical illustration of an attribute map and a horizon map, generated according to an embodiment of the invention.

Each of FIGS. 3 and 4 is a graphical illustration of an attribute map and a horizon map, generated according to an embodiment of the invention. In embodiments depicted in FIG. 3, for each picked point, attribute map 106 may display attribute 110, for example, an iteration number. The attribute may be displayed as, for example, a color, brightness, etc. In embodiments depicted in FIG. 4, for each picked point, attribute map 106 may display a number of attributes 110, for example, an iteration number and a number of points chosen by processing the picked point. For each of FIGS. 3 and 4, attribute map 106 may be draped onto, overlaid onto, or added to a 3D topographic horizon map 104. For each point, attribute map 106 may display a visual representation associated with an attribute 110 value or value range. For example a number of generations, iterations, or picks, or a range of these numbers, may be associated with a visual attribute such as color, brightness, etc. Other point attributes may be associated with other visual attributes.

Figure 5:
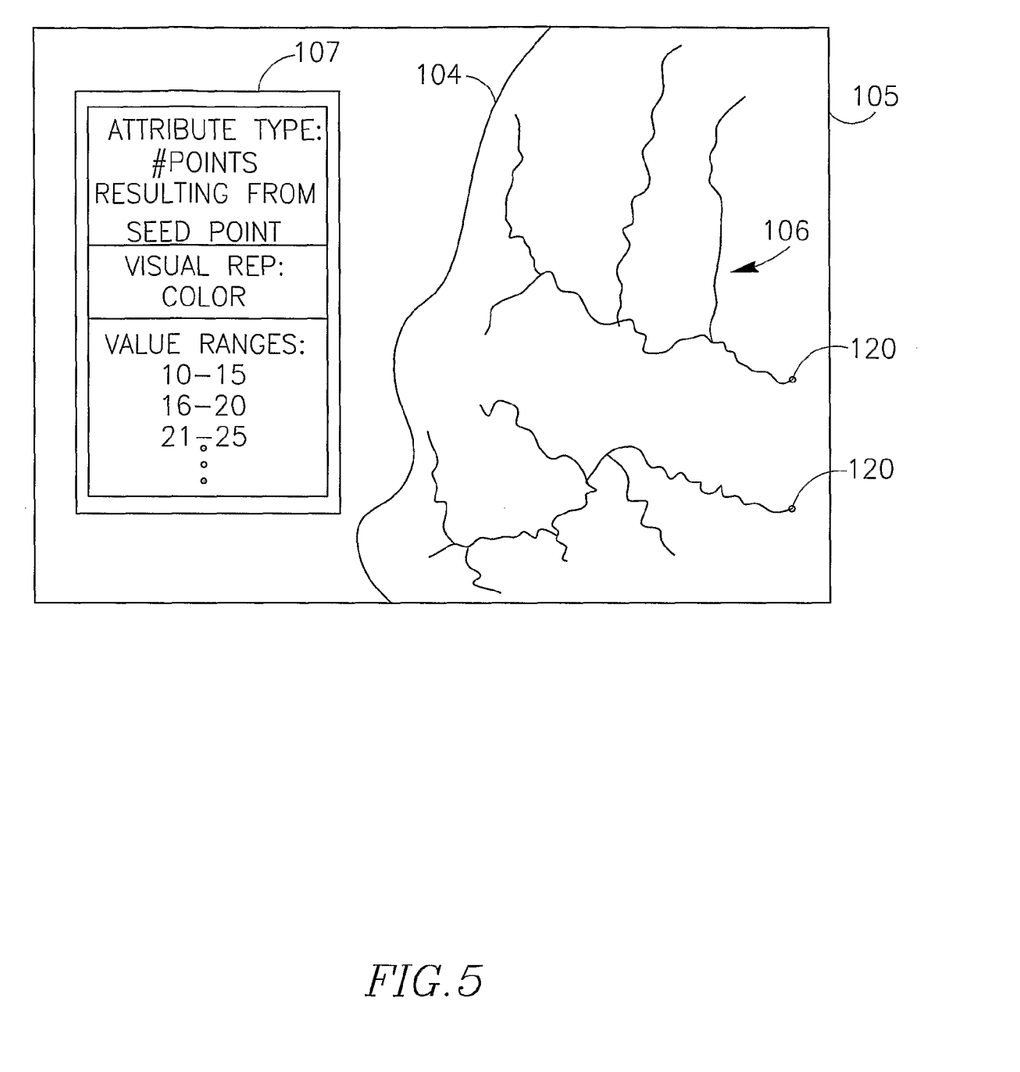
FIG. 5 is a graphical illustration of an attribute map displayed with a horizon map, according to one embodiment of the invention.

FIG. 5 is a graphical illustration of an attribute map displayed with a horizon map, according to one embodiment of the invention. Attribute map 106 may be draped onto, overlaid onto, or added to a 3D topographic horizon map 104. Attribute map 106 may display attribute 110, for example, the number of points picked resulting from one or more start points or seed points 120, using a picking algorithm. Threshold values may be set (e.g., manually by the user of automatically by horizon picking module 102) so that only points with attribute 110 values greater or equal to the threshold values, may be displayed in attribute map 106. For example, attribute map 106 may only display picked points with a number of resultant picks greater than the threshold values. For example, value ranges A, B, and C, may be, for example, 10-15, 16-20, and 21-25, respectively. The threshold value for being displayed in attribute map 106 is 10. Thus, picked points with attribute 110 values less than 10 may not be displayed in attribute map 106. The threshold values for being displayed with the visual representation corresponding to A, B, and C, are 10, 16, and 21, respectively.

Attribute values above threshold values may be illustrated as the "river" lines in FIG. 5. FIG. 5 does not show the gradual change in the number of steps (or generations) that an algorithm talks to come to a picked point from its seed point, as shown in FIGS. 2, 3, and 4. This provides a view much like a watershed which shows the direction of propagation of the pick algorithm for the entire horizon. Since this particular algorithm follows paths of maximum similarity for the seismic trace interval being analyzed this map may indicate the "grain" of the seismic data which in turn indicates geologic information about this interval.

Graphical or visual representations other than color, translucency, brightness, dots, columns, or lines may be used.

Figure 6:
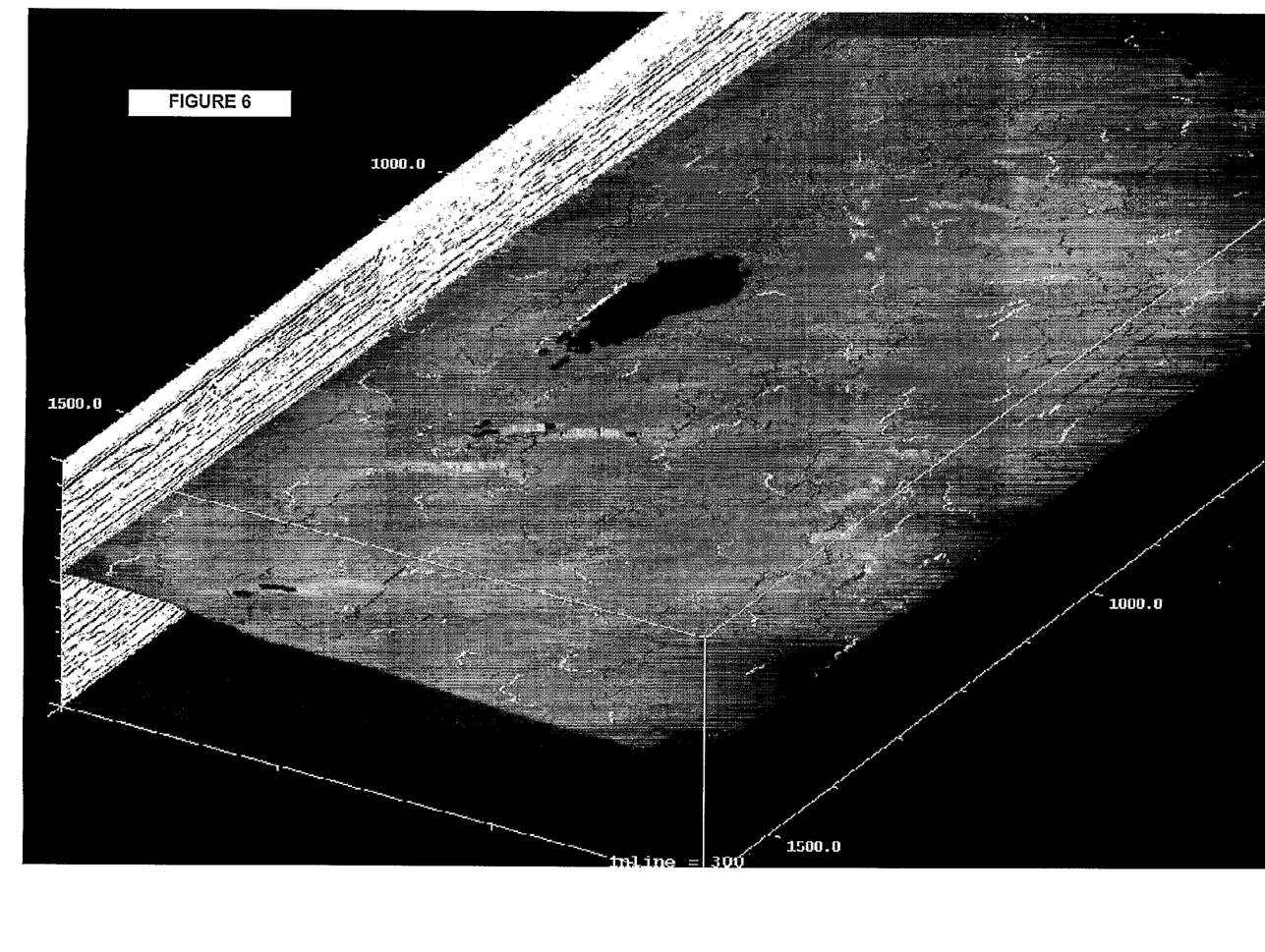
FIG. 6 is a graphical illustration of an attribute map and a horizon map, generated according to an embodiment of the invention.

FIG. 6 is a graphical illustration of an attribute map and a horizon map, generated according to an embodiment of the invention of the horizon map. In some embodiments, attribute map 106 may include, for example, structural and stratigraphic grain for showing the progression of an iterative process, such as a seed picking algorithm, through seismic data 103 according to one embodiment of the invention. Attribute map 106 may display attributes 110, including for example, the number of points chosen by processing each picked point. The user may set the color scale to a threshold of any number of resulting picks so that only very prolific picked points with large number of resultant picks are accentuated. FIG. 6 may show prolific picks in black, less prolific picks in green, then picks that are even less prolific in red and finally the least prolific picks in magenta. Other colors or visual attributes may be used. Attribute data may be illustrated as the "river" lines in FIG. 6. This provides a view much like a watershed which shows the direction of propagation of the pick algorithm across the horizon map 104. Since this particular algorithm follows paths of maximum similarity for the seismic trace interval being analyzed this map may indicate the "grain" of the seismic data which in turn indicates geologic information about this interval.

Figure 7:
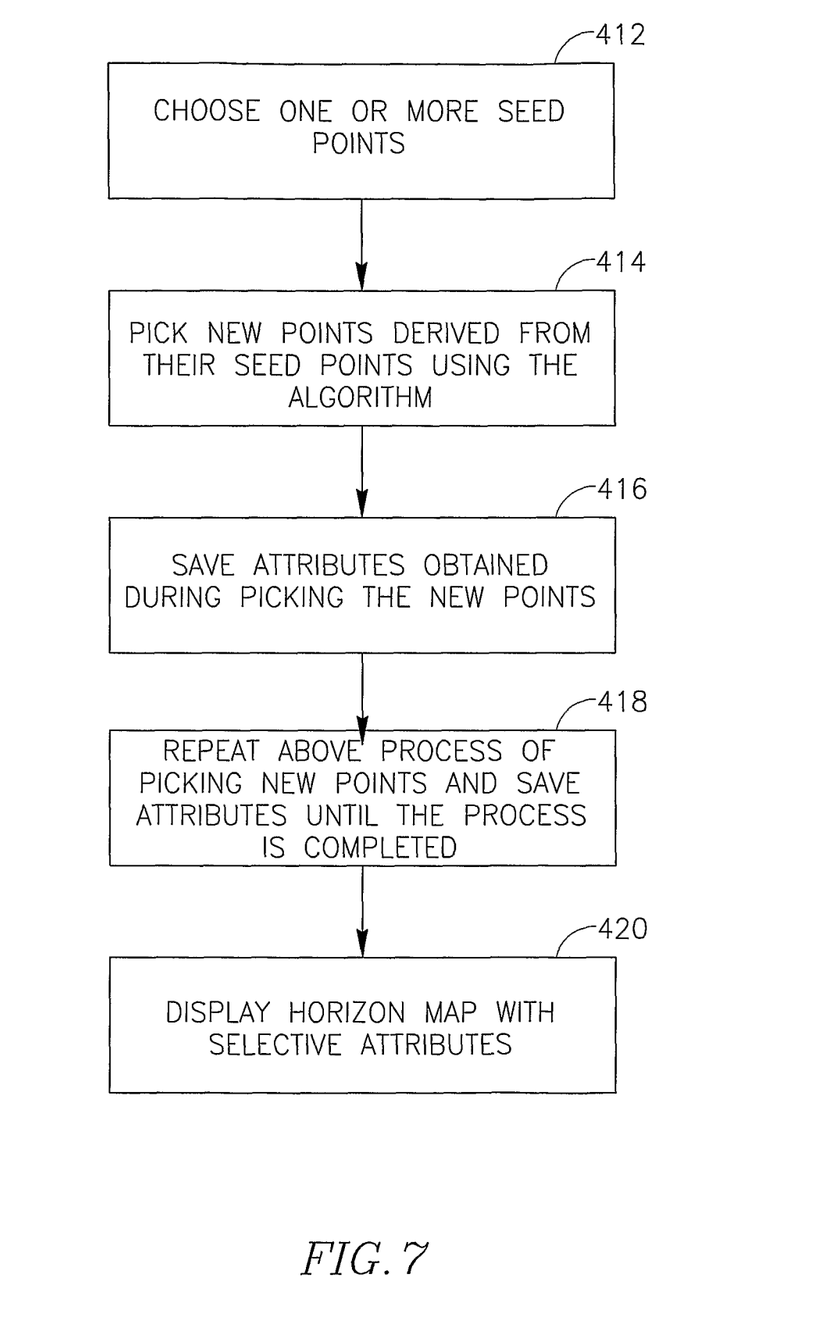
FIG. 7 is a flowchart illustration of a method for recording and presenting horizon maps with selective attributes according to one embodiment of the invention.

FIG. 7 is a flowchart illustration of a method for recording and presenting horizon maps with selective attributes according to one embodiment of the invention.

According to one embodiment of the invention as shown in FIG. 7, an iterative process, for example, a point picking algorithm may start for example by choosing one or more or a set of seed points in a 3D seismic data set, as indicated at operation 412. In one embodiment, this choice may be made by a user; in another embodiment this may be done automatically by horizon picking software, for example, software 102 (FIG. 1). A new set of points may be picked, which may be derived from the seed points, as indicated at operation 414, following an iterative process or algorithm, for example, a seed picking algorithm, that may be for example known in the art. For example, the points adjacent to the current seed point(s) may be chosen, based on certain criteria, and these points may be seed points in the next iteration. A set of points may include one or more points. For example, a set may include, for example only one item.

To repeat the seed picking algorithm, each of the points in the new set of points may be set as a seed point and the algorithm may be repeated. In some embodiments, at each iteration the process may be applied to points neighboring the points currently being processed. In the process of picking the new set of points, certain attributes associated with these new points may be generated. For example, the iteration may be recorded, and those points processed or chosen on this iteration may be assigned an iteration number, or a number corresponding to this iteration number. For example, the iteration number may be a number corresponding to the number of times the algorithm is applied or executed to pick the point. According to one embodiment of the invention, these attributes may be saved or recorded as indicated at operation 416.

According to one embodiment, the attributes may include, for example, the number of iterative steps or iteration number (also known as generations), which may indicate for example geological information on the gradient or rate of change in lithology of the crust of earth between a picked point and its seed point. For example, each picked point may be assigned an iteration number. According to another embodiment, the attributes may include, for example, the number of points that have resulted from or have been found based on a preceding seed point or the number of descendants from the seed point. This attribute may contain for example two-dimensional information on the change of lithology. According to another embodiment, the attributes may include, for example, the direction of propagation of the seed picking algorithm and/or the order in which the points are picked, information relating to the azimuth directions of progression of the points picked. For example, at a particular picked point the attribute may be the average value of azimuth direction of the propagation or progression to, and from, the picked point.

As indicated at operation 418, the point picking process described above at operations 414 and 416 may be repeated until certain criteria such as, for example, all the boundary points of a horizon map being generated, are met.

According to one embodiment of the invention, after the completion of the point picking process, one or more attributes saved or recorded during the picking process may be displayed selectively, as indicated at operation 420. In one embodiment, attributes may be displayed as a visual representation of the relationship between the seed point and each of the points in the new set of points. The display of selective attributes may help a user, for example, a petroleum exploration professional, identify geometric and geological information from the horizon map generated by a computer system. It will be appreciated by persons skilled in the art that the present invention is not limited to what has been particularly shown and described hereinabove. Rather the scope of the present invention is defined only by the claims, which are presented in the claim section.

What is claimed is:

1. A method for displaying 3D seismic data comprising:
   accepting an indication of a first point in a 3D seismic data set;
   executing using a computer processor a seed picking algorithm, using the first point for picking a set of second points from the data set;
   setting using a computer processor each of the points in the set of second points as the first point and repeating the algorithm;
   assigning using a computer processor an iteration number to each of the second picked points, the iteration number corresponding to the number of algorithm executions needed to generate the picked point from the first point; and
   displaying information that represents the iteration number for each picked point.

2. The method of claim 1, comprising:
   assigning a first value range associated with a first color and a second value range associated with a second color; and
   displaying information that represents the iteration number by displaying a point as the first color when the iteration number falls within the first value range and as the second color when the iteration number falls within the second value range.

3. The method of claim 1 comprising for each of a set of points displaying a visual representation relating to the number of points that are found by executing the algorithm when the point is used as the first point.

4. The method of claim 1 comprising displaying information that relates to the direction of propagation with which the algorithm picks points.

5. The method of claim 1 comprising displaying information that relates to the azimuth of propagation with which the algorithm picks points.

6. The method of claim 1 comprising displaying a visual representation of the relationship between the first and second points.

7. The method of claim 6, wherein the visual representation comprises color.

8. The method of claim 1 comprising displaying when the relationship between the first and second points is substantially meets a predetermined threshold value.

9. The method of claim 1 wherein displaying information that represents the iteration number comprises displaying for each point a plurality of visual representations, each visual representation corresponding to one of a plurality of attributes for the point, one of the plurality of attributes including the iteration number.

10. The method of claim 9, wherein a second of the plurality of attributes is selected from the group consisting of the number of descendants of a point and the direction of propagation of the horizon picking process.

11. The method of claim 1, wherein the first point is selected by a user.

12. A method for processing 3D seismic data, the method comprising:
    applying using a computer processor an iterative process to a set of seismic data points, the process starting at a seed data point, each iteration in the process corresponding to an iteration number, wherein at each iteration the process is applied to points neighboring the points currently being processed;
    recording for a set of data points the iteration number in which the point was processed; and
    displaying information that represents the iteration number in which each point was processed.

13. The method of claim 12 wherein displaying information that represents the iteration number comprises displaying the data points, each data point being displayed according to an attribute, the attribute corresponding to the iteration number.

14. The method of claim 12, comprising displaying each point according to a visual representation corresponding to the iteration number for that point, wherein the visual representation is a color.

15. The method of claim 12 comprising displaying information that relates to the direction of propagation in which the process is applied to points.

16. A system for processing 3D seismic data, the system comprising:
    a processor for applying an iterative process to a set of seismic data points, the process starting at a seed data point, each iteration in the process corresponding to an iteration number, wherein at each iteration the process is applied to points neighboring the points currently being processed;
    a memory for recording for a set of data points the iteration number in which the point was processed; and
    a display for displaying information that represents the iteration number for each point in the set of seismic data points.

17. The system of claim 16, further comprising a user interface for displaying the data points, wherein displaying information that represents the iteration number comprises each data point being displayed according to an attribute, the attribute corresponding to the iteration number.

18. The system of claim 16, wherein displaying information that represents the iteration number comprises the processor displaying each point according to a visual representation corresponding to the iteration number for that point, wherein the visual representation is a color.

* * * * *